(12) United States Patent
Albelo

(10) Patent No.: US 11,353,727 B2
(45) Date of Patent: Jun. 7, 2022

(54) ELECTROMAGNETIC SIGNAL MODULATOR

(71) Applicant: Jeffrey Albelo, Portland, OR (US)

(72) Inventor: Jeffrey Albelo, Portland, OR (US)

(*) Notice: Subject to any disclaimer, the term of this patent is extended or adjusted under 35 U.S.C. 154(b) by 423 days.

(21) Appl. No.: 16/697,142

(22) Filed: Nov. 26, 2019

(65) Prior Publication Data

US 2020/0150463 A1    May 14, 2020

Related U.S. Application Data

(63) Continuation-in-part of application No. 16/685,715, filed on Nov. 15, 2019, and a continuation-in-part of application No. 16/441,867, filed on Jun. 14, 2019, which is a continuation-in-part of application No. 15/421,701, filed on Feb. 1, 2017, now Pat. No. 10,386,489.

(51) Int. Cl.
*G02F 1/015*    (2006.01)

(52) U.S. Cl.
CPC .......... *G02F 1/015* (2013.01); *G02F 2202/36* (2013.01)

(58) Field of Classification Search
CPC ...... G01S 17/89; G01S 7/4817; G01S 7/4811; G01S 7/4818; G02F 1/015; G02F 2202/36; G02F 1/0151; G02F 1/017; G02F 1/01725
See application file for complete search history.

(56) References Cited

U.S. PATENT DOCUMENTS

| | | | | |
|---|---|---|---|---|
| 5,291,034 A | * | 3/1994 | Allam | ............ G02F 1/3556 257/17 |
| 2018/0356342 A1 | * | 12/2018 | Laycock | ............ G02B 26/06 |

* cited by examiner

*Primary Examiner* — Luke D Ratcliffe
(74) *Attorney, Agent, or Firm* — Mark S Hubert

(57) ABSTRACT

The present invention is an electromagnetic signal modulator that is a control unit operationally coupled to a substantially transparent and partially conductive substrate plate assembly having a series of quantum dots that undergo an excitation and successive recombination (or relaxation) of their electrons by the input of magnetic, optical or electrical signals to switch, steer or otherwise modulate an electromagnetic beam incident on the substrate plate assembly. There are four factors that may be used to vary the quantum dot electromagnetic environment, providing operator flexibility as to how the modulation of the incident electromagnetic wave front is accomplished and to what degree.

13 Claims, 7 Drawing Sheets

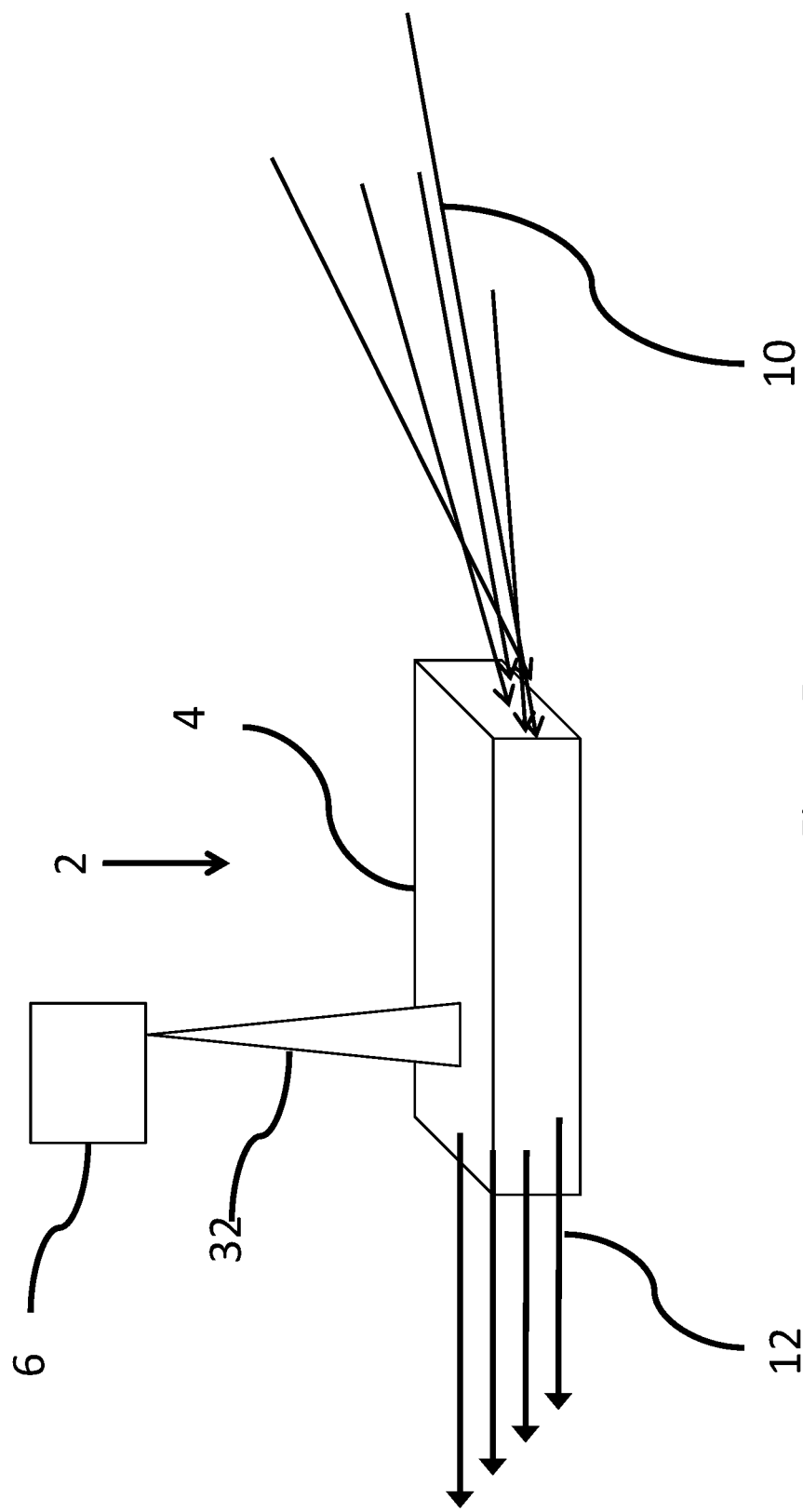

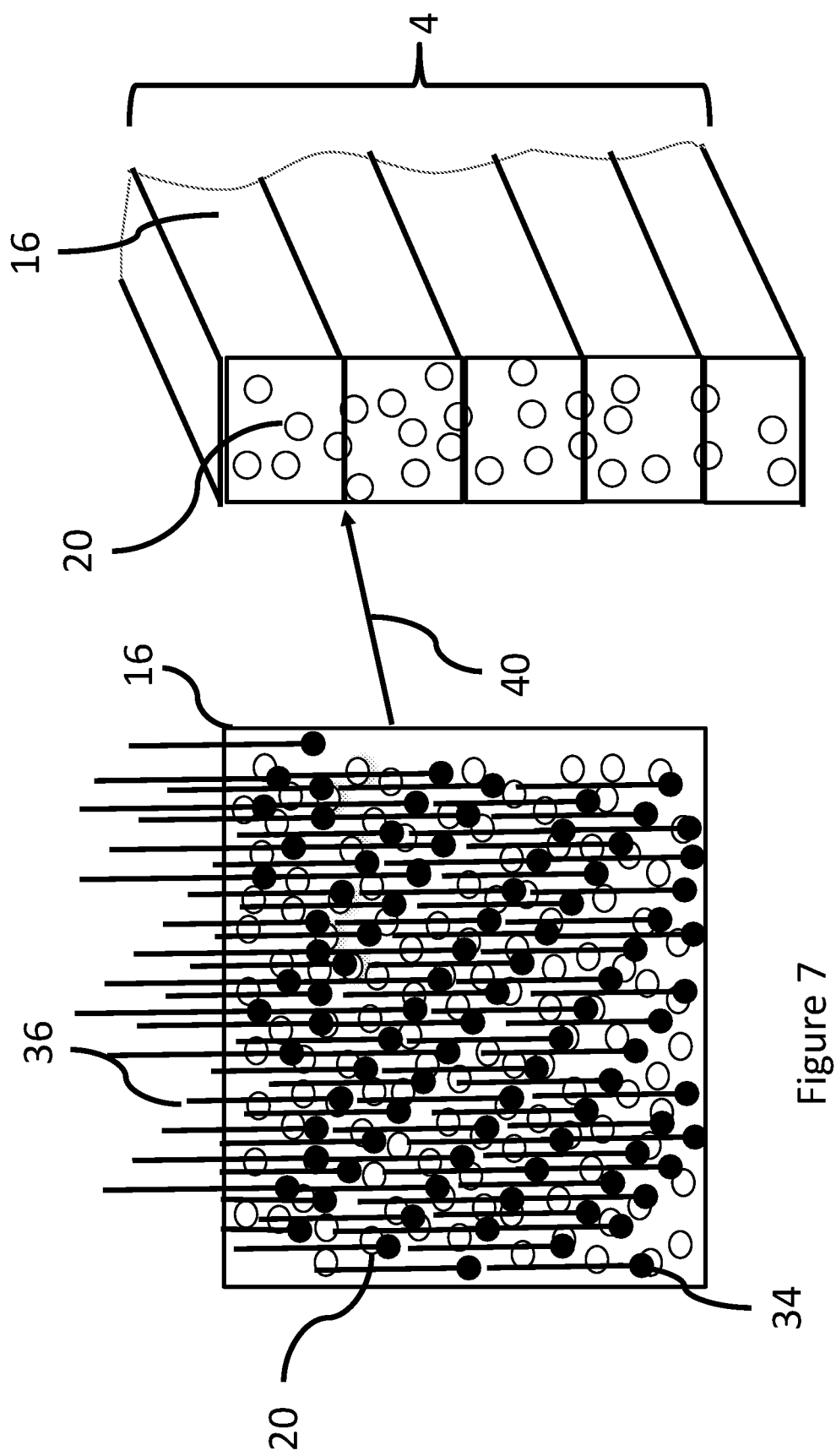

ELECTROMAGNETIC SIGNAL MODULATOR

PRIORITY

This application is a continuation-in-part of U.S. Utility application Ser. No. 16/441,867 filed Jun. 14, 2019 which is a continuation-in-part of U.S. Utility application Ser. No. 15/421,701 filed Feb. 1, 2017 (now U.S. patent Ser. No. 10/386,489 issued Aug. 20, 2019). This application is also a continuation-in-part of U.S. Utility application Ser. No. 16/685,715 filed Nov. 15, 2019. This application incorporates by reference all of the patent applications it claims priority from.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to equipment for the steering of electromagnetic radiation, and more particularly to electromagnetic signal modulator technology.

BACKGROUND

Electromagnetic signal modulators are commonly used to modulate a light beam so as to switch or steer the electromagnetic beam or alter its amplitude or change its electromagnetic properties. Modulators are either absorptive modulators or refractive modulators based on the properties of the material that are used to modulate the light beam. In absorptive modulators the absorption coefficient of the material is changed, in refractive modulators the refractive index of the material is changed.

Any application that requires high speed switching and variable aperture size, such as navigational systems, phased array LIDAR, optical sensing, spectroscopy, high speed data processing for optical computing, and the like are limited by current structures, material configurations and combinations. Currently, the upper operating threshold for switching speeds and wavefront modulation by state-of-the-art electromagnetic signal modulators, lies in the 150 kHz range. The best electromagnetic wave signal to noise ratio attainable with commercially available electromagnetic signal modulators is less than 60 db. These parameters are currently limiting the development of theoretically proven electronic devices in a plethora of fields.

Thus, a refractive electromagnetic signal modulator able to increase the switching efficiency (increase speed) and increase the signal to noise ratio of electromagnetic waves, especially optical beams incident upon it, would fulfill a long felt need in any industry utilizing electromagnetic signal processing. This new invention utilizes and combines known and new technologies in a unique and novel configuration to overcome the aforementioned problems and accomplish this.

BRIEF SUMMARY

In accordance with various embodiments, a refractive electromagnetic signal modulator capable of increased switching speeds and wavefront modulation up to 100 GHz is provided.

In another aspect, a refractive electromagnetic signal modulator capable of an electromagnetic wave signal to noise ratio of 200 dB is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 5 is another representative view of the electromagnetic signal modulator 2;

FIG. 6 is a representative view of a multi substrate plate assembly 4 arranged in a vertical configuration;

FIG. 7 is a horizontal cross-sectional view of the multi plate assembly 4 of FIG. 6 in its vertical configuration.

DETAILED DESCRIPTION OF CERTAIN EMBODIMENTS

Figure 1:
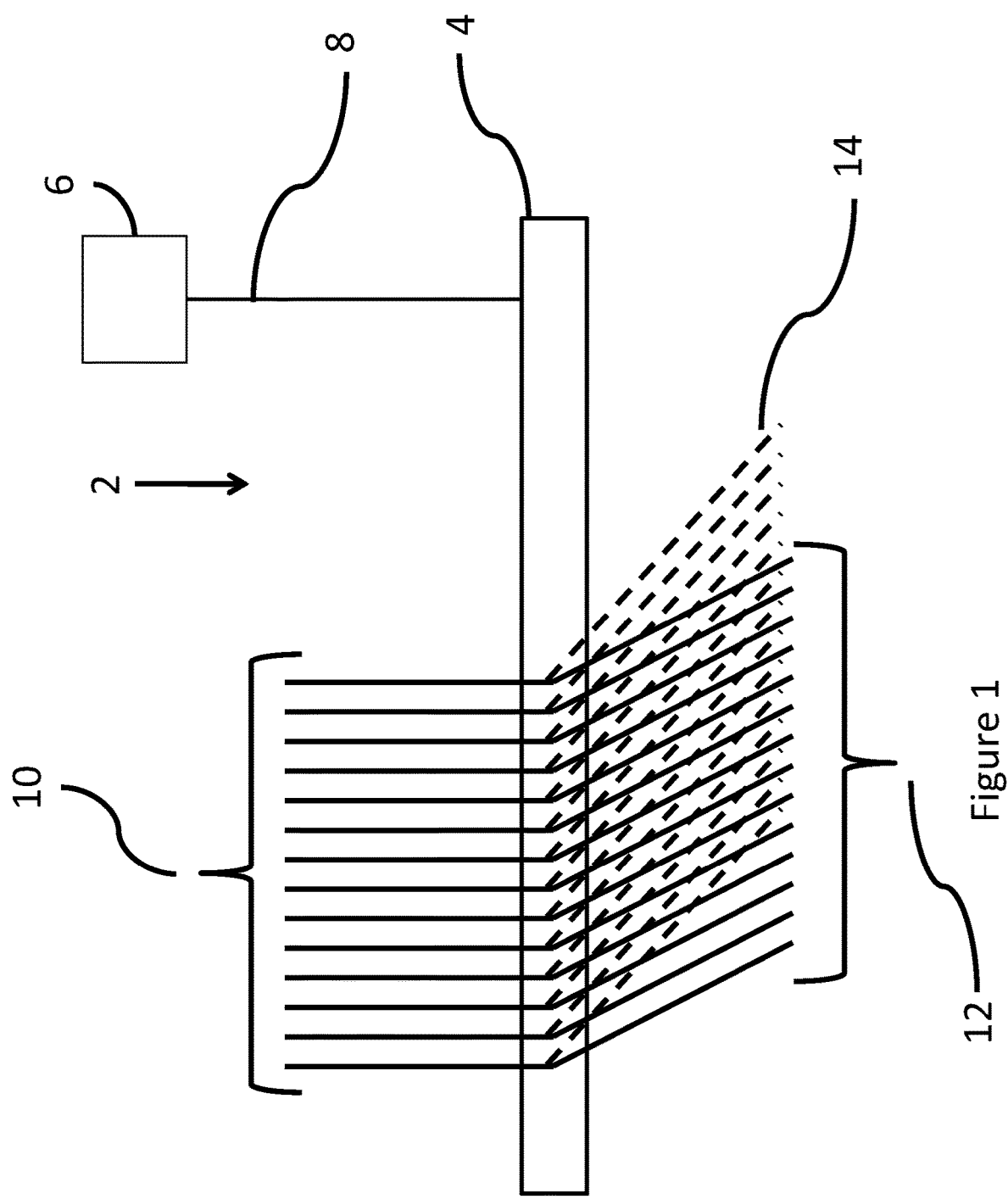
FIG. 1 is representative view of an electromagnetic signal modulator in operation steering an incoming electromagnetic wavefront.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

The term "series of quantum dots" or "quantum dots" or as used herein refers to a grouping of elements including molecules, atoms, molecular clusters, ions, agglomerated particles, Nano clusters, individual Nano particles, and carbon Nano tubes, whether having an inducible or permanent dipole moment, or not that can be electrically addressed for use in creating a modulator of electromagnetic signals.

As used herein the term "arbitrary size" refers to a grouping of all possible sizes as used with respect to "particles" present in the devices described herein. The sizes can exist of any range, but the optimal results occur when the particles are distributed over a narrow size distribution, typically less than 200 nm.

As used herein the term "partially conductive substrate plate" refers to a grouping of all possible substrate materials that are by nature or can be rendered conductive to electrical, thermal, magnetic or optical signals for use in affecting the local electronic environment within, on, or next to the substrate plate used in signal modulation.

As used herein, the term "signal" refers to both the plural and singular form of the word. i.e. signal and signals, and refers to any electromagnetic wave or particle generated within, on, in, in the vicinity of, or near the modulator.

As used herein the term "substantially transparent" means capable of passing more than 5% of the incident radiation.

As used herein the term "partially conductive" with respect to the substrate plate, means capable of sending or receiving a signal through, from or over a metallic, dielectric or semiconducting material, which could comprise any of a number of materials, including, but not limited to, glass, polymers, gels, ceramics, organic molecules, carbon in any form, crystalline or amorphous materials or mixtures, layers or stacks thereof.

As used herein the term "inducible dipole moment" refers to any number of charges that can be placed into, on, through or near any "quantum dot" resulting in a user controllable change in the polarizability and/or permeably of the quantum dot, local environment or dielectric substrate after the receipt of an external signal containing the charge or triggering its release.

As used herein the term "permanent dipole moment" refers to a dipole or charge that persists without any external control input.

As used herein, the term "dipole" refers to any electrical point or area charge localized on, in or near a quantum dot in the modulator.

As used herein, the term "control unit" is any controllable variable frequency electromagnetic signal generator that generates and provides a controllable variable frequency electromagnetic signal to the substrate plate assembly to excite the quantum dots. (This may be an RF signal, and IR signal, an optical signal or any suitable electromagnetic signal.)

As used herein, the term "optically coupled" or "optical coupling" refers to a method of transmitting electromagnetic signals with wavelengths between 50 nanometers and 100,000 nanometers. This is generally accomplished by impingement either direct or reflected of the electromagnetic signal onto the substrate plate assembly. An example would be of the aiming of a laser light beam from the output of the control unit to the input of the substrate plate assembly. An other example would be an array of LEDS illuminating the substrate assembly in order to affect the desired quantum dot excitation.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for an electromagnetic signal modulator (preferably an optical modulator) that is a control unit operationally coupled to a substantially transparent and partially conductive substrate plate assembly having at least one substantially transparent and partially conductive substrate plate (hereinafter plate) with a generally planar face thereon that has a series of quantum dots (of an arbitrary size but narrow size distribution) affixed with the plate, where each of the quantum dots possess an inducible dipole moment, and each of the quantum dots are in electrical contact with the plate, where the quantum dots undergo an excitation and successive recombination (or relaxation) by the input of magnetic, optical or electrical signals.

The recombination time is modulated by the spatial and electronic environment of the quantum dots within each layer of the device (i.e. between the plates), which can be different or the same, from plate to plate or layer to layer in the case of a multiplate device.

The novelty here, aside from the structure of the modulator, resides in the variability of the quantum dot electromagnetic environment which provides operator flexibility as to how the modulation of the incident electromagnetic wave front is accomplished and to what degree. The degree of wavefront modulation is directly related the change in permittivity and permeability of the quantum dots. Simply stated, changing the electromagnetic environment of the substrate plate assembly (as detailed herein) and more specifically of the quantum dots thereon, enables a plethora of electromagnetic switching and steering functions to be accomplished at speeds heretofore unattainable (by orders of magnitude).

These changes in the electromagnetic environment of the substrate plate assembly are optimized adjusting four factors: the size of the quantum dot, the character of the ligands on the quantum dot (ligand chemistry), the ratio of the core to shell diameter of the quantum dot, and the spacing between adjacent substantially transparent and partially conductive substrate plates. The adjustments in the electromagnetic environment that change the permittivity and permeability of the quantum dots may be affected by alteration of any one, or combination of the aforementioned factors.

By tuning these four parameters, the user can tailor make an tunable electromagnetic modulator with customized operating frequencies, which enables operation of the modulator in modes that are ideally suited to the particular application. One such customizable feature is the frequency at which the recombination rate experiences resonant behavior under electrical or optical or magnetic excitation. This enables the modulator to exhibit wave front steering by rapidly switching between refractive index state differences ($\Delta n$) as large as two. Of particular note, are those frequencies of the drive signal whereby the modulator exhibits a negative refractive index. This is both novel and critically important behavior for an optical modulator in that the S/N ratio will increase by at least an order of magnitude, and the overall modulator transmission performance will be nearly loss-less (relative to transmission efficiency).

Uniformity of spacing between parallel, adjacent plates is ensured by using sets of identically sized dielectric spacers. In the preferred embodiment these are glass spheres. Changing the plate spacing alters the electric field strength that the quantum dots experience as drive signals of variable frequency are applied from a control unit. Excitation of the quantum dots occurs primarily by promotion of an electron from the valence band to the conduction band. After the quantum dots experience this excitation, a number of mechanisms exist for the relaxation or recombination of the electron with the quantum dot. By way of example, Auger scattering is a reasonably efficient mechanism for recombination/relaxation that is observed in the so-called intra-dot regime, and being so efficient occurs at a fast rate of less than 10 Picoseconds. Because of this short relaxation timing, the modulation of an incident electromagnetic wavefront can be accomplished by drive signals from the control unit at frequencies of up to and potentially in excess of 100 GHz. This results in an improvement in existing electro-optical modulators by as much as six orders of magnitude. This enables highly efficient and very fast raster scanning and also unprecedented point-to-point scanning. Bigger spacing between the plates decreases the electric field between them where the quantum dots are, slowing down the excitation rate of the quantum dots. This allows for fine tuning of resonant frequencies within the electromagnetic modulator. Having control over the resonant frequencies gives the ability to change the index of refraction over a fairly wide range and even create a device where the index of refraction can be negative.

Increasing and decreasing the spacing between adjacent plates will have a linear inverse effect on the observed electric field between the plates as measured from the point of view of the quantum dots. This can act as a means for fine-tuning the switching frequency by altering the rate at which the quantum dots are being excited and thus the rate at which carriers (electrons in this case) are generated.

Further altering the size of the quantum dots will enable one to fine-tune the effective mass of the electrons in the quantum dots. This is important because the switching rate of the device is inversely proportional to the dot size. This is observable spectroscopically by virtue of smaller dots producing longer relaxation periods due to an increase in the effective mass and the subsequent decrease in carrier mobility.

Utilizing quantum dots where a dipole can be induced creates the last piece of the puzzle, since the effective refractive index is driven by the polarizability and magnetic permeability of the quantum dot system. Altering these quantities by judicious choice of the above parameters, enables highly customizable switches, beam scanners, multiplexers, and generalized EM modulation across a wide range of fields and application.

FIG. 1 shows an electromagnetic signal modulator 2 made of a substrate plate assembly 4 and control unit 6. Here, the control unit 6 is shown as electrically connected via hard wire 8 to the substrate plate assembly 4, as would be the case where the control unit 6 was providing a non-optical (electrical) drive signal to the substrate plate assembly 4 so as to effect the modulation (here the steering) of the incident electromagnetic wavefront 10 into the modulated electromagnetic wavefront 12. With the application of a different electromagnetic drive signal from the control unit 6 to the substrate plate assembly 4, the steering angle can be further modulated as represented by the further modulated wavefront indicted by dashed lines 14.

Figure 2:
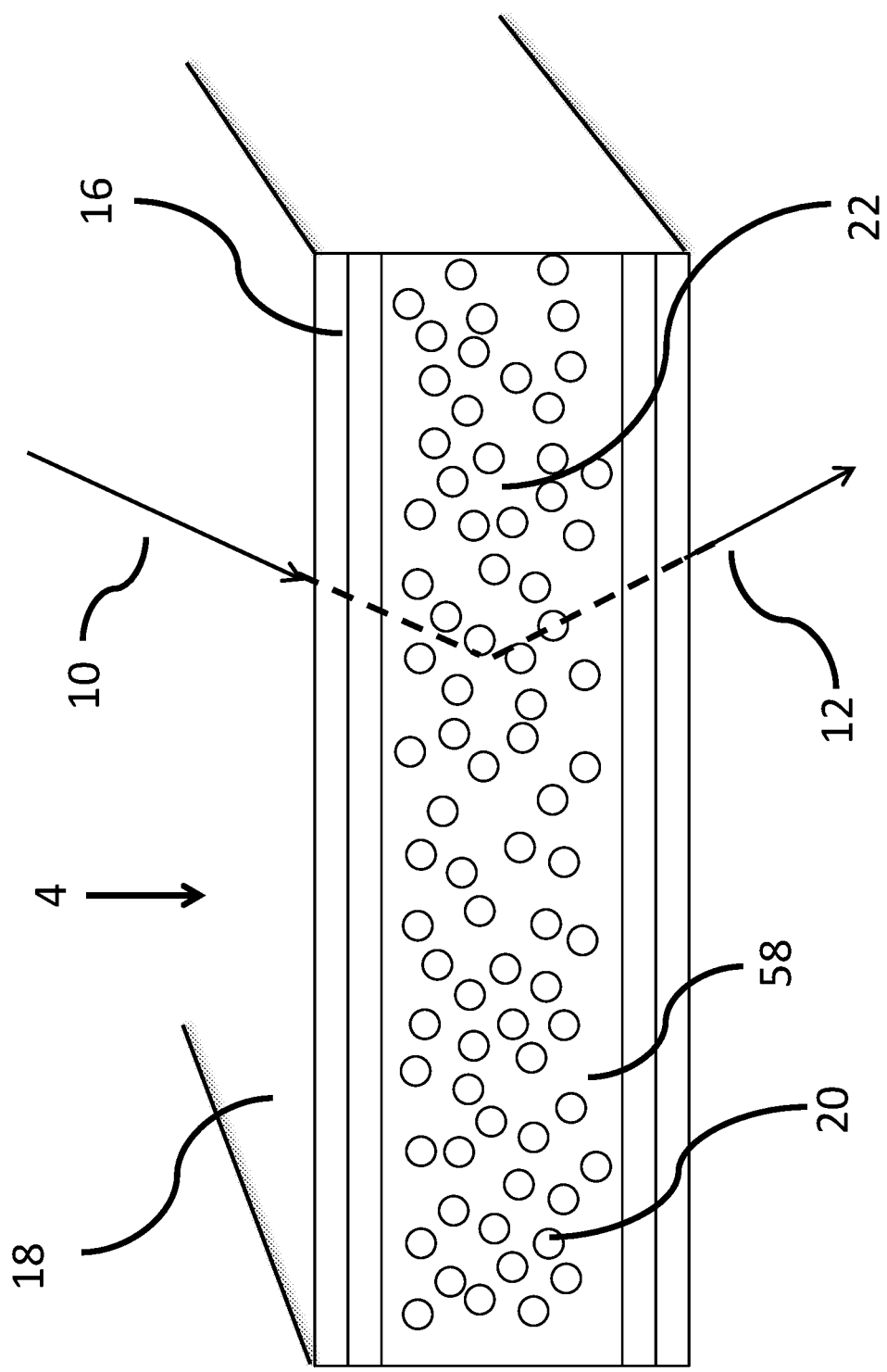
FIG. 2 is a cross-sectional view of the substrate plate assembly.

FIG. 2 shows the substrate plate assembly 4 with an expanded view of its central layer 22. Here, it can be seen that the substrate plate assembly 4 comprises at least one planar, substantially transparent and partially conductive substrate plate 16 having at least one generally planar face 18 thereon having a series of quantum dots 20 (of an arbitrary size but narrow size distribution) affixed with the plate 16, where each of the quantum dots 20 possess an inducible dipole moment, and each of the quantum dots 20 are in electrical contact with the plate 16, where the quantum dots 20 undergo an excitation and successive recombination (or relaxation) by the input of magnetic, optical or electrical signals to the substrate plate assembly 4 from the control unit 6. (Shown in FIG. 1)

The electrical contact between the quantum dots 20 and the substrate plate 16 may be affected using a transparent conductive oxide grid, a set of conductive finger lines, vertical conductive vias and/or by using a conductive or semiconductive material selection for the plate.

Figure 3:
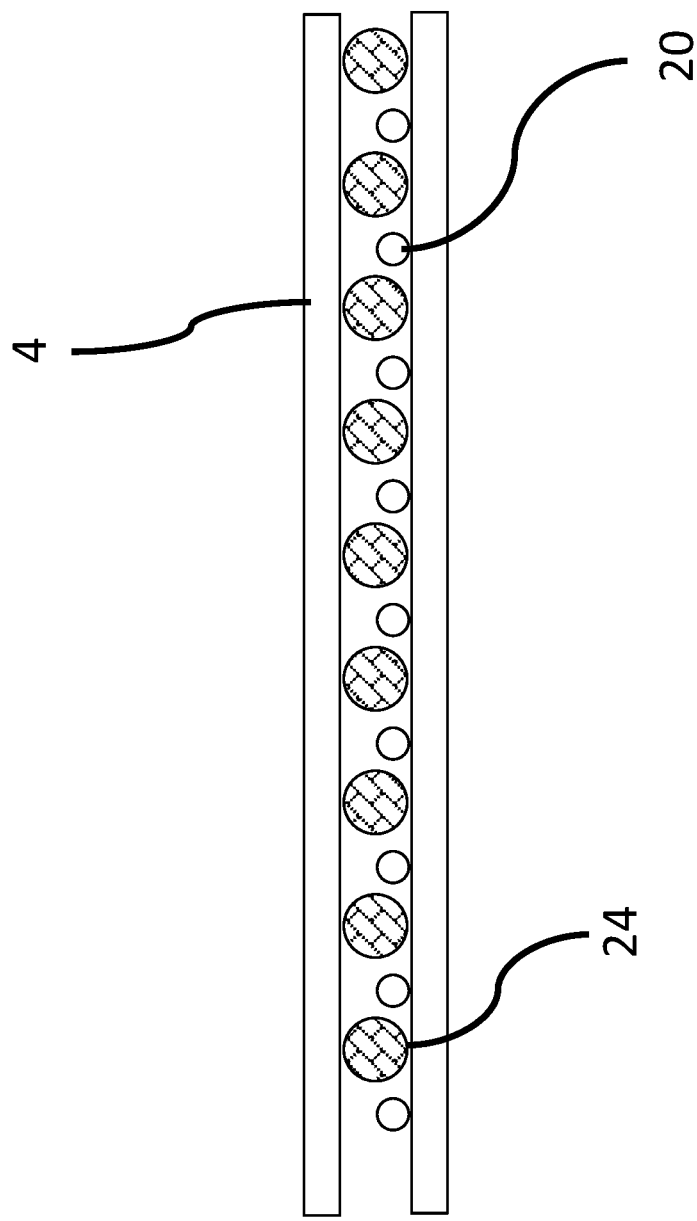
FIG. 3 is a representative view of a multiple substrate plate assembly.

FIG. 3 illustrates one construct of how the variable spacing of adjacent, parallel substrate plates 4 in a multiple substrate plate assembly 4 may be accomplished. The view has been expanded vertically to show the arrangement of quantum dots 20 and spherical glass spacers 24 between the adjacent, parallel substrate plates 4. The spacers must be at least the diameter of the quantum dots 20, and made of a dielectric material, all the same size, but may range in dimension up to 5 mm in diameter. By changing the spacing (the diameter of the spacers) the resonant field characteristics can be varied, according to user requirements as dictated by the application. This will affect the switching speed, steering angle, linear or non-linear response characteristics, and dynamic range (e.g. signal to noise ratio).

Figure 4:
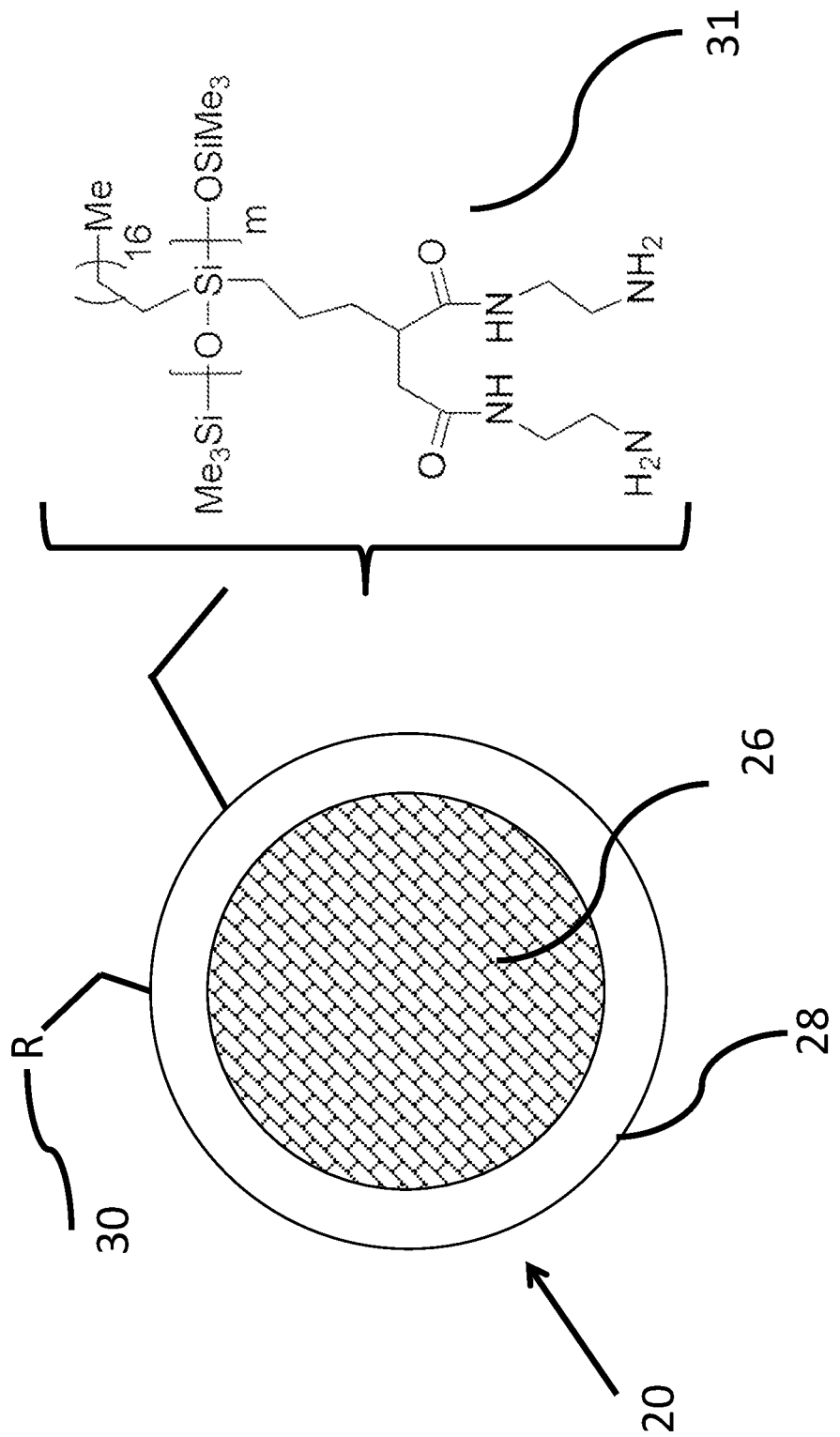
FIG. 4 is a representative view of a quantum dot.

FIG. 4 is a quantum dot. The quantum dot 20 has a core 26 upon which is grown a shell 28 of nano crystals. This shell 28 is usually grown onto the core 20 to a uniform thickness after the core has been formed. This shell 28 has a different band gap than the material of the core 26. The shell 28 is selected from the group of compound semiconductors comprising but not limited to InP, CdS, ZnSe, GaAs, InGaP, any II-VI, III-VII compound semiconductor, as well as those of doped intrinsic semiconductors such as Si. Bonded to the shell 28 are ligands 30 that aid in the spacing and arrangement of the quantum dots 20. The ligands impart electrical characteristics to the quantum dots 20 and create a permeable dielectric barrier between neighboring quantum dots 20. Ligands are organic molecules that are chemically bonded to the shell 28. The ligands 30 are additionally utilized to confer user selected switching behavior (modulation behavior) that affect the electromagnetic signal modulator's refractive index range (from + to −). Chemical compound 31 is but an example of a commonly used ligand 30 with quantum dots 20. More generally, Ligands are organic compounds of variable chemical functionality containing as many as 50 or as few as 3 carbon atoms, typically arranged in linear or branched chains. These groups are typically given the generic designation R in accordance with chemical naming conventions (as shown in FIG. 4, 30).

FIG. 5 is a conceptual representation of the electromagnetic signal modulator 2 wherein incident electromagnetic wavefront 10 is modulated (steered) into modulated wavefront 12 by the application of an optical drive signal 32 from the control unit 6 to substrate plate assembly 4. Note, herein that the control unit 6 is not directly physically connected to the substrate plate assembly 4.

FIG. 6 is a representative view of a multi substrate plate assembly 4 depicted in a vertical configuration. Here the individual substantially transparent and partially conductive substrate plates 16 can be seen in stacked a parallel arrangement with the quantum dots 20 therebetween and or thereon the plates 16. For visual clarity the spacers 24 and ligands 30 have been removed.

FIG. 7 shows a horizontal cross-sectional view of the multi plate assembly 4 of FIG. 6 taken at the interface of two plates 16. It illustrates the three-dimensional nature of the substrate plate assembly 4 and an embodiment of electrical contact between the quantum dots 20 and a substrate plate 16 at the location indicated by arrow 40 (the top face of a substrate plate 16). Quantum dots 20 are distributed on the surface of least one substrate plate 16 within the volume of the substrate plate assembly 4. The stack of substrate plates in the substrate plate assembly 4 are electrically connected by conductive traces 36 and metal vias 34 to operationally connect the substrate plate assembly 4 to the control unit 6 (in the case of an electric drive signal)

Figure 8:
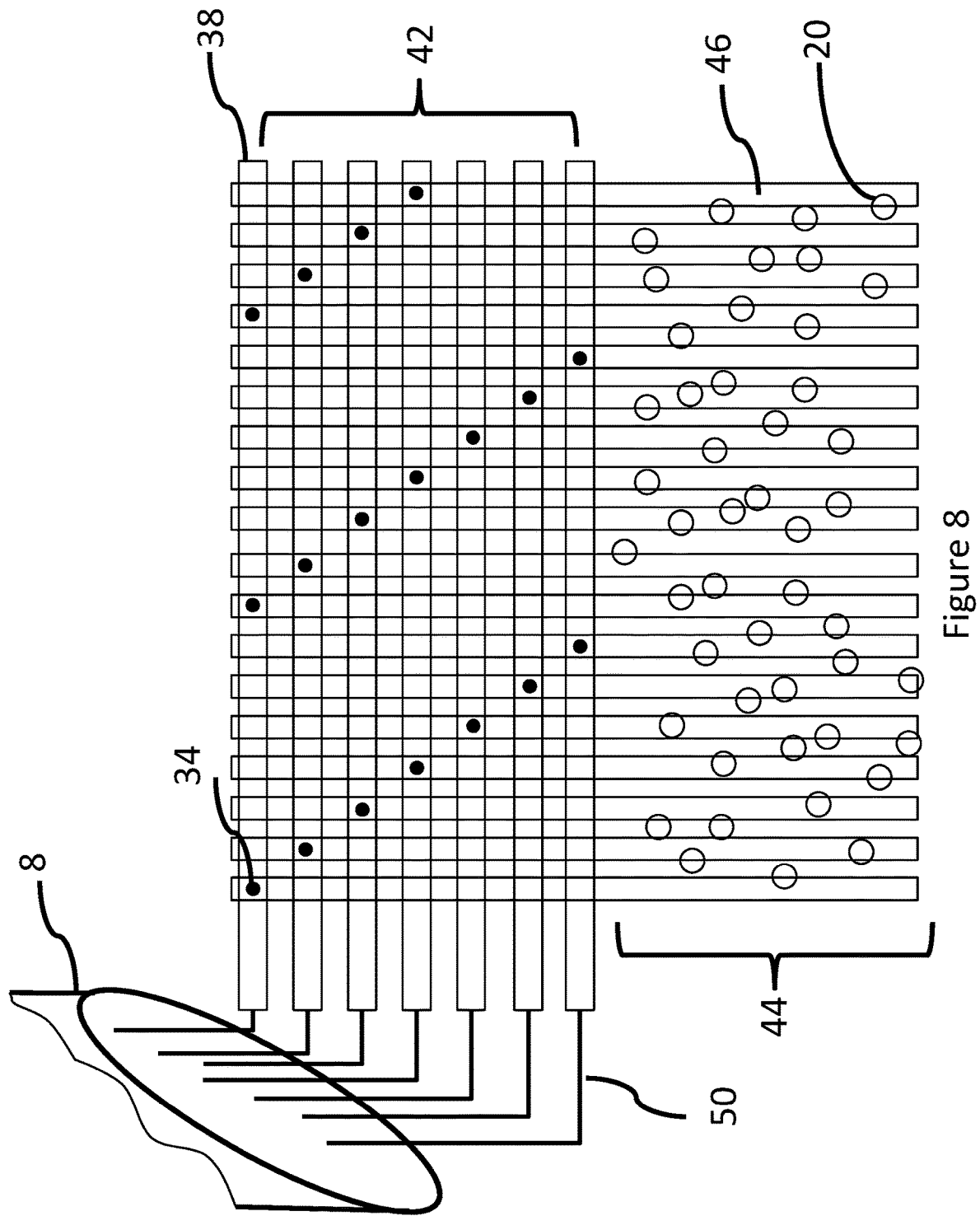
FIG. 8 is an expanded view of the signal conduction architecture of a substrate plate in the electromagnetic signal modulator.

FIG. 8 is an exploded view of a section of the multi plate assembly 4 showing the interconnect scheme of conductive traces on one layer of the multi plate assembly 4 (as taken at the top face of a substrate plate 16 via its conductive traces 36 and metal vias 34. It can be seen that the wire bundle for the hard wire direct connection 8 to the control unit 6, is a bundle of smaller conductors 50 connected to the interconnect header 42 comprising individual metallic traces 38 providing electrical contact through metalized conductive vias 34 to the transparent conductive pathways 46 on the glass, comprising the active portion 44 of the electromagnetic signal modulator 2 to which the quantum dots 20 have been applied.

The fabrication of the modulator is accomplished in the following manner. The quantum dots are selected according to the bandgap of the materials (e.g. InP) relative to the target wavelength of device operation according to very well-established methodology. Utilizing industry standard practices, the dots (quantum dot cores) are grown to a target size with a user selectable size distribution (size dispersion or dispersion) and the isolated quantum dots cores are subjected to industry standard protocols for growing a suitable shell of user selectable size and material (e.g. ZnSe) thereon the quantum dot core. Once isolated, the quantum dots are subjected to industry standard practice for functionalizing the quantum dots with suitable ligands. The solvated dots are then applied to the substrate plates that have been rendered partially conducting and substantially transparent. Once applied optional ALD (atomic layer deposition) treatments can be applied as dictated by the particular target application. The interconnect structures are then applied to the plate and the device is assembled and connected to the appropriate driver circuitry.

In an alternate embodiment, the quantum dots may be imbedded within a suitable dielectric material 58 (FIG. 2) such as $Al_2O_3$ deposited by atomic layer deposition (ALD) in order to further isolate and stabilize the electric charge on the individual quantum dots. In so doing, the quantum dot environment and subsequent polaron dynamics can be further optimized to enhance Auger scattering recombination lifetimes. Intra-dot Auger relaxation of bound carriers through scattering is directly affected by polaron dynamics where the effective mass of the electrons (liberated from the quantum dot by excitation) can extend the relaxation time of this scattering mechanism from less than 10 Pico seconds to around 250 Pico seconds, where this relaxation time scales with the electron's effective mass, which is modulated by quantum dot (core and shell) diameter.

In use, a control unit is operationally coupled to a substrate plate assembly either by direct hard ware connection (the case of non-optical electromagnetic drive signals) or is optically coupled (in the case of optical electromagnetic drive signals) to provide an electromagnetic signal that excites the quantum dots. An incoming electromagnetic beam is directed into the substrate plate assembly and the parameters of quantum dot size, ligand chemistry, quantum dot core diameter to shell diameter ratio, and plate spacing are adjusted (alone or in concert) to accomplish the desired switching speed or degree of electromagnetic beam steering. The degree of steering is additive, with each successive layer imparting additional wavefront deflection (steering) to reach the desired degree of steering. The individual layers are driven by the application of the control signal, which need not be the same, such that each successive layer may add different amounts of steering, without regard to the steering degree added in previous or subsequent layers.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments. Likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

What is claimed:

1. An electromagnetic signal modulator comprising:
   a control unit comprising a variable frequency electromagnetic signal generator; and
   a substrate plate assembly comprised of at least one of a substantially transparent and partially conductive substrate plate having at least one generally planar face thereon with a series of quantum dots affixed with said substantially transparent and partially conductive substrate plate, each of a quantum dot in said series of quantum dots being of an arbitrary size, and each said quantum dot possessing an inducible dipole moment, and each said quantum dot in electrical contact with said partially conductive substrate plate;
   a wire;
   wherein said control unit is operationally connected to said substantially transparent and partially conductive substrate plate assembly by said wire, to transmit an electromagnetic signal to said substantially transparent and partially conductive substrate plate assembly so as to excite said series of quantum dots; and
   wherein said quantum dots have a core and a shell affixed onto said core.

2. The electromagnetic signal modulator of claim 1 wherein there is at least one of a ligand affixed to said shell.

3. The electromagnetic signal modulator of claim 2 further comprising:
   at least one of a spacer, and
   wherein said substrate plate assembly has multiple said substantially transparent and partially conductive substrate plates arranged in parallel layers; and
   wherein at least one of said spacers resides between adjacent said substantially transparent and partially conductive substrate plates.

4. The electromagnetic signal modulator of claim 2 wherein said shell is selected from the group of compound semiconductors comprising InP, CdS, ZnSe, GaAs, InGaP, any compound semiconductor from the II-VI, III-V, I-VII vertical columns in the periodic table, and doped intrinsic semiconductors such as Si.

5. The electromagnetic signal modulator of claim 2 further comprising:
   at least one transparent conductive path on at least one of said substantially transparent and partially conductive substrate plates;
   wherein said wire is a wire bundle of smaller conductors connected to an interconnect header on at least one of said substantially transparent and partially conductive substrate plates, said smaller conductors comprising individual metallic traces providing electrical contact through metalized conductive vias to said transparent conductive path.

6. The electromagnetic signal modulator of claim 3 further comprising:
   a dielectric material between said substantially transparent and partially conductive substrate plates.

7. An electromagnetic signal modulator comprising:
   a control unit comprising a variable frequency electromagnetic signal generator; and
   a substrate plate assembly comprised of at least one of a substantially transparent and partially conductive substrate plate having at least one generally planar face thereon with a series of quantum dots affixed with said substantially transparent and partially conductive substrate plate, each of a quantum dot in said series of quantum dots being of an arbitrary size, and each said quantum dot possessing an induced dipole moment, and each said quantum dot in electrical contact with said substantially transparent and partially conductive substrate plate;
   wherein said control unit is optically coupled to said substrate plate assembly to transmit an electromagnetic signal to said substrate plate assembly so as to excite said quantum dot; and
   wherein said quantum dots have a core and a shell affixed onto said core.

8. The electromagnetic signal modulator of claim 7 wherein there is at least one of a ligand affixed to said shell.

9. The electromagnetic signal modulator of claim 8 further comprising at least one of a spacer, and wherein said substrate plate assembly has multiple said substantially transparent and partially conductive substrate plates arranged in a configuration of parallel layers; and wherein said spacer resides between adjacent said substantially transparent and partially conductive substrate plates.

10. The electromagnetic signal modulator of claim 9 wherein said shell is selected from the group of compound semiconductors comprising InP, CdS, ZnSe, GaAs, InGaP, any compound semiconductor from the II-VI, III-V, I-VII vertical columns in the periodic table, and doped intrinsic semiconductors such as Si.

11. The electromagnetic signal modulator of claim 10 further comprising:

a dielectric material between said substantially transparent and partially conductive substrate plates.

12. The electromagnetic signal modulator of claim 1 wherein said quantum dots have a core and at least one of a ligand affixed to said core.

13. The electromagnetic signal modulator of claim 7 wherein said quantum dots have a core and at least one of a ligand affixed to said core.

* * * * *